March 26, 1929. B. B. JACKSON Re. 17,249

BOTTLE BRUSH

Original Filed Sept. 3, 1927 2 Sheets-Sheet 1

Inventor:-
Benjamin B. Jackson
By:- Williams, Bradbury, McCaleb & Hinkle
Atty's.

March 26, 1929. B. B. JACKSON Re. 17,249

BOTTLE BRUSH

Original Filed Sept. 3, 1927 2 Sheets-Sheet 2

Inventor:
Benjamin B. Jackson
Williams, Bradbury
M & Caleb & Hinkle.
Attys.

Reissued Mar. 26, 1929. Re. 17,249

UNITED STATES PATENT OFFICE.

BENJAMIN B. JACKSON, OF DELPHI, INDIANA.

BOTTLE BRUSH.

Original No. 1,678,943, dated July 31, 1928, Serial No. 217,385, filed September 3, 1927. Application for reissue filed January 16, 1929. Serial No. 332,987.

My invention relates to bottle brushes and more especially brushes which are adapted to clean small-necked bottles. My brush, however, has wide application and can be used on wide-necked bottles and also on other receptacles which are not strictly "bottles".

One object of my invention is to provide a bottle brush which, while it can be introduceed through a relatively small neck if necessary, carries bristles so arranged that those which are disposed adjacent the side wall of the bottle when the brush is in use will point toward the side wall, while those bristles which lie adjacent the bottom of the brush will point toward the bottom and also toward the bottom corner. The advantage I gain is that I secure a scouring action by the ends of the bristles on the side wall, bottom and bottom corner of the bottle, rather than merely a wiping or "stroking" action over some areas as would be the case if the bristles were normally supported in more or less parallelism with the surfaces they are to contact.

A further object of my invention is the design of a brush having these characteristics which can be manufactured economically, as, for example, by the standardized twisted wire core brush construction which brush manufacturers are usually well equipped to manufacture. In such a construction the bristles are radially arranged on the core and their ends constitute a cylindrical surface with the core as its axis.

I preferably effect the foregoing objects by using such a twisted wire or other cylindrically surfaced brush construction, the axis of which is conformed to follow a peculiar curve which may variously be described as the fractional convolution of a conical spiral, or a fractional convolution of a cylindrical spiral of varying pitch, or a line parabolically curved in two intersecting planes. In general, the characteristic of this form of curve—however described—is such that, described in reference to a conventional design of pop bottle, for example, in which the brush would be inserted for use, the curve toward the upper end of the brush would be more or less in parallelism with the axis of the bottle, but at its bottom the axis of the brush would be more or less in a plane at a normal to the axis of the bottle. Thus, if the curve of the axis of the brush were developed about a cylinder, it would be a fractional convolution and one of very rapidly increasing pitch starting (at the bottom end of the brush) at about ninety degrees to the axis of the cylinder, and increasing to more or less parallelism with the axis of the cylinder. In practice, the precise geometric definition of the curve of the axis of the brush may vary within considerable latitude. It need not be exact because the core of the brush itself is preferably quite resilient, and the radial bristles themselves are relatively long and are also resilient, so that the brush as a whole will give sufficiently to adapt itself to my purpose of a universal scouring action for the several surfaces of the brush.

The foregoing and other objects, advantages and features of my invention are set forth in the following description and in the accompanying drawings wherein Fig. 1 is an elevational veiw of my brush within a bottle showing the bottle in cross section;

Figure 1:
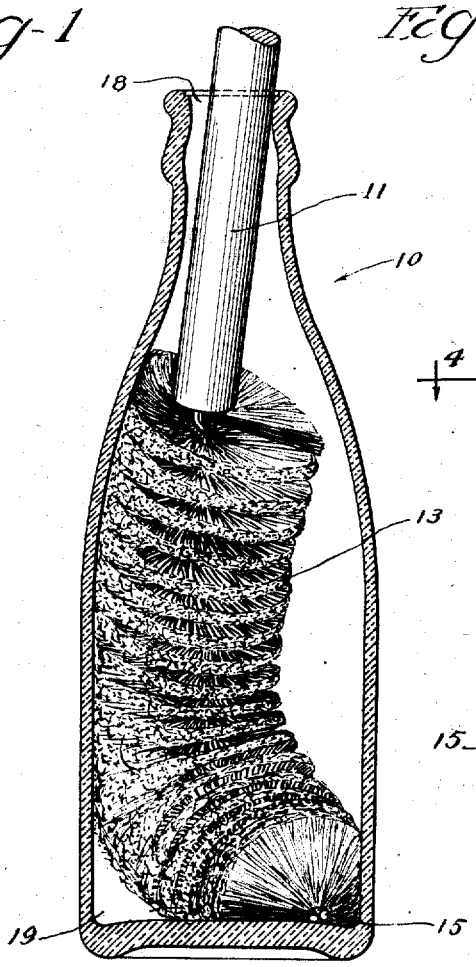

My bottle brush as a whole, 10, may comprise in general a handle portion 11, a bristle supporting member or core 12, and a plurality of radially extending bristles 13, distributed along the core. Preferably, for economy of manufacture, the supporting member or core 12 consists of a pair of wires 14 twisted together with uniform length bristles therebetween so that each bristle extends diametrically of the core and the ends of the bristles as a whole, while more or less helically spiraled, form a cylindrical surface with the core as its axis. I contemplate, however, that this is only one of many ways in which the bristles could be mounted. Due to the peculiar curve I have above described for the axis of the brush, the bristles along the upper end of the brush lie more or less in the planes normal to the axis of the bottle, so that the radial bristles extend toward the side wall of the bottle. At the bottom end 15 of the brush the axis of the brush has turned through some ninety degrees and the bristles extend in a plane parallel to, and preferably almost coinciding with, the axis of the bottle. The transition of the successive convolutions of bristles which constitute the brush from a plane generally normal to the axis of the bottle to a plane radial to the axis of the bottle, is a gradual transition. Also, the transition is more gradual at the upper end of the brush and becomes more pronounced or accelerated at the lower point of the brush. As a result, the bristles maintain their characteristic of pointing toward the side walls of the bottle except at the region adjacent the bottom end of the brush where their turn is more pronounced, and they extend toward the bottom and bottom corner of the bottle. But the resiliency of the supporting core and the resiliency of the bristles themselves permit the brush to give sufficiently to effect a satisfactory scouring action throughout the entire length of the brush.

The lower end 15 of the twisted wire core does not point toward the bottom of the bottle nor toward the bottom corner, but is brought more or less into parallelism with them, so that the bristles tend to hold the end of the twisted wire out of scratching contact with the inner surfaces of the bottle.

Figure 2:
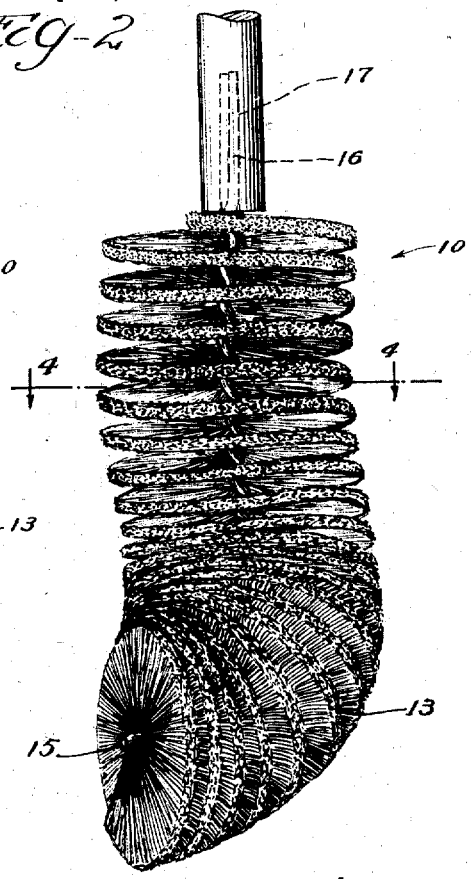
Fig. 2 is an elevational view of my brush at right angles to the view of Fig. 1.
Figure 3:
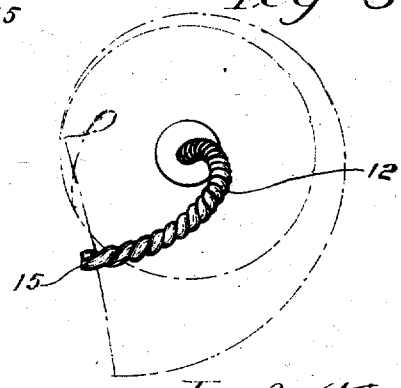
Fig. 3 is a bottom plan view of the handle and bristle supporting member showing the outline of the bristles in dotted lines.
Figure 4:
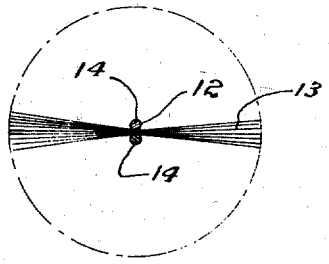
Fig. 4 is a detail cross-sectional view on the lines 4—4 of Fig. 2.
Figure 5:
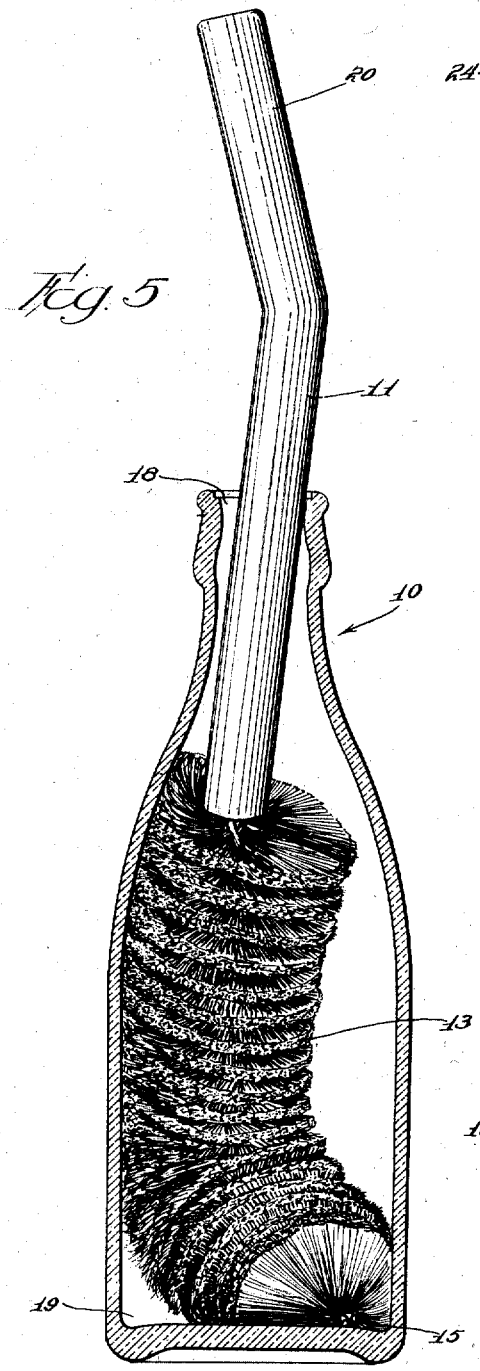
Fig. 5 is an elevational sectional view of another embodiment of my bottle brush.
Figure 6:
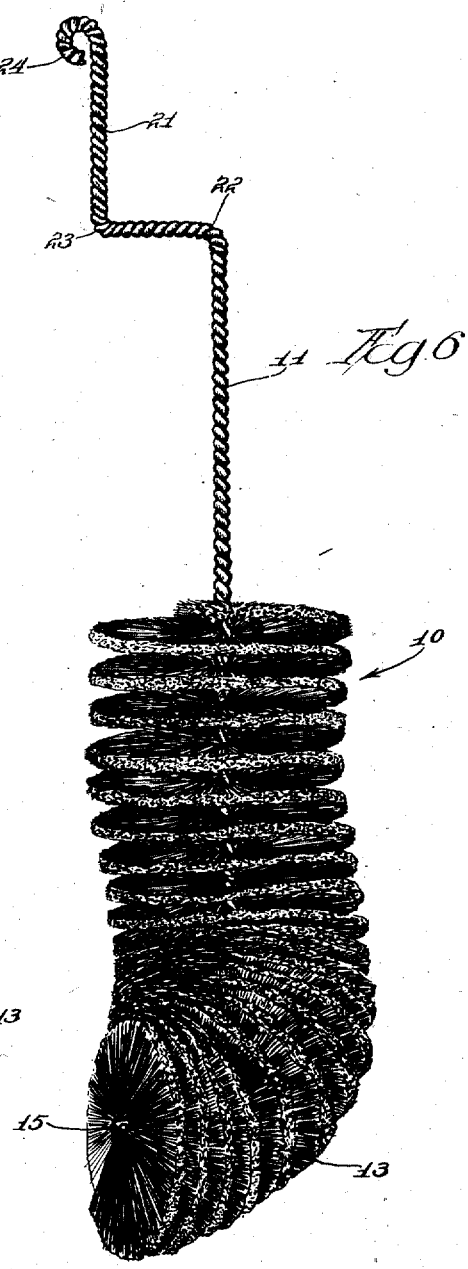
Fig. 6 is a similar elevational view of another embodiment of the bottle brush in a slightly different position.

If the brush is rotated by twisting the handle 11, all of the inner surfaces of the bottle are scrubbed by an action which calls into play the ends of the bristles, which are most effective in dislodging foreign matter. The handle 11 of the brush can be made of a straight length of wood or the like, or if desired the handle can be given a slight turn as at 20 (Fig. 5) to give a crank action. This offset 20 would be offset in a direction opposite to that in which the bottom end 15 is offset. The neck 18 of the bottle—either with or without the crank handle feature—may conveniently act as a fulcrum to help force the lower end 15 of the brush into the bottom corner of the bottle. Any such pressure also will tend to deform the resilient core of the brush, if necessary, to insure that a good scouring action is obtained over the entire inside area of the bottle. If desired, the wire core may itself constitute the handle and be offset into a more formal crank handle 21 by bends as at 22 and 23 (see Fig. 6). The outer end 24 of the twisted wire core can be turned into an eye for hanging the brush on a hook and shielding the sharp end of the wire. Fig. 2 shows a convenient method of affixing the wooden handle by a bore 17 in the lower end of the handle 11, into which the upper end 16 of the twisted wire is driven.

My brush is inserted in a narrow-necked bottle by an action somewhat comparable to that of a corkscrew, and rotation of the brush at such time will serve to clean the inner surface of the neck itself and the inner surface of the flared portion just below the neck, and again in removing the brush the neck will similarly be scoured. The fact that the curve of my brush is but a fractional convolution of a helix permits it to scour the inner cylindrical surface of a bottle of a much greater diameter than the neck of the bottle through which the brush must be inserted. It will be noted that my brush does not require any hinged portions which have heretofore often been employed to permit the insertion and removal of a brush which would secure more or less of the simultaneous scouring action of the several surfaces which I seek. Nor does my brush require an unusual or exceptional placing of certain of the bristles or the attachment of special bristles for scouring the bottom corner of the bottle. All of the bristles of my brush may be formed by the same manufacturing process and as a part of the standard cylinder-like brush construction. Special placement of certain bristles or the use of different kinds of tufts of bristles in the same brush result in a construction which is difficult to manufacture by ordinary and standardized machine processes.

In further explanation of the peculiar curve I give the brush, and possibly for convenience in manufacturing operation, the curve could be defined as one developed by bending a straight core into a curve in a single plane, which curve would cover an arc of ninety degrees or so, and with the radius of curvature least at the lower end increasing to infinity at the other end,—and then giving this curved core another and similar curve in a second plane at right angles to the first plane. The arc of the second curve, however, might vary from a few degrees up to or even beyond ninety degrees.

While I have thus described this specific embodiment of my invention, I contemplate that many changes may be made therefrom without departing from the scope or spirit of my invention as defined in the appended claims.

I claim:

1. A bottle brush longitudinally insertable through the neck of a bottle for simultaneous scouring engagement with the side wall, bottom and bottom corner of the bottle, comprising a multiplicity of radially projecting bristles arranged to form a cylindrical surface having a curved axis constituting a fractional convolution of a helix of increasing pitch with a lesser radius of curvature at the bottom end and a greater radius of curvature toward the upper end.

2. A bottle brush for longitudinal insertion through the neck of a bottle and having bristles arranged in a cylindrical conformation, which is so curved that, when the brush is in use, the bristles at the upper end of the brush extend toward the side wall of the bottle and below the upper end of the brush gradually turn so that the bristles at the lower end extend toward the bottom and bottom corner of the bottle for simultaneous engagement with the side wall, bottom and bottom corner of the bottle upon rotation of the brush.

3. A cleaning brush comprising a plurality of deformable cleaning members supported by a supporting member adapted to be inserted longitudinally through the neck of a bottle and the supporting member being spiraled through a fractional convolution such that certain of said cleaning members respectively come in simultaneous engagement with the wall, bottom, and bottom corner of the bottle.

4. A cleaning brush comprising a plurality of bristles and a supporting core for the same, said core being curved like a helix of increasing pitch, having an axially projecting handle.

5. A bottle brush comprising a rod-like core having transversely extending bristles carried thereby, the core being spiralled with increasing pitch through a fractional convolution whereby its end portion extends substantially along the bottom corner of the bottle when in use, with the transversely extending bristles extending therefrom toward the corner and with the bristles at other portions extending toward the side wall of the bottle.

6. A bottle brush comprising a twisted wire core supporting diametrically extending bristles arranged to form a cylindrical body, said core being curved through substantially a quarter convolution, and in three dimensions, with decreasing radius of curvature toward its lower end.

7. A bottle brush comprising a core having transversely extending bristles carried thereby, one end of said core forming a handle, the end portion of said brush adjacent said handle extending substantially axially therewith, the other end portion of the brush being spiralled a fractional convolution about an axis substantially parallel to the handle, to permit introduction into a narrow necked bottle, said curvature being such that the bristles may lie against the inner side of the bottle, rest flat against the bottom of the bottle, and extend into the lower corner thereof.

8. A cleaning brush comprising a plurality of bristles and a supporting member for the same, said supporting member being curved like a helix of increasing diameter and pitch and having an axially projecting handle.

9. A bottle brush comprising a rod-like core having transversely extended bristles carried thereby, the core being conically spiral with its end portion arranged to extend substantially along the bottom corner of the bottle when in use with the transversely extending bristles pressing into the corner, and with the bristles at other portions pressing against the side wall of the bottle substantially throughout its height.

In witness whereof, I hereunto subscribe my name this 22 day of December, 1928.

BENJAMIN B. JACKSON.